United States Patent [19]

Kirk

[11] Patent Number: 4,803,548
[45] Date of Patent: Feb. 7, 1989

[54] COLOR VIDEO IMAGE ENHANCEMENT

[75] Inventor: Richard A. Kirk, Herts, England

[73] Assignee: Crosfield Electronics Limited, London, England

[21] Appl. No.: 127,144

[22] Filed: Dec. 1, 1987

[30] Foreign Application Priority Data

Jan. 12, 1987 [GB] United Kingdom ............... 8700565

[51] Int. Cl.$^4$ .............................................. H04N 9/64
[52] U.S. Cl. ........................................ 358/36; 358/37
[58] Field of Search .................................. 358/36, 37

[56] References Cited

U.S. PATENT DOCUMENTS

| 4,400,721 | 8/1983 | Macovski | 358/37 |
| 4,612,570 | 9/1980 | Nakagaki et al. | 358/37 |
| 4,630,307 | 12/1986 | Cok | 358/37 |
| 4,739,395 | 4/1988 | Johanndeuter et al. | 358/37 |

Primary Examiner—John W. Shepperd
Attorney, Agent, or Firm—Sughrue, Mion, Zinn, Macpeak and Seas

[57] ABSTRACT

A method and apparatus for enhancing a video image defined by luminance information and chromaticity information comprises, for a number of selected regions of the image, (a) determining using a microcomputer (22) a statistical relationship between the luminance information and the chromaticity information for the selected region; and, (b) generating modified chromaticity information for at least a portion (1) of the selected region by applying the determined statistical relationship to the luminance information for the said portion.

7 Claims, 3 Drawing Sheets

COLOR VIDEO IMAGE ENHANCEMENT

FIELD OF THE INVENTION

The invention relates to methods and apparatus for enhancing a video image.

DESCRIPTION OF THE PRIOR ART

In conventional colour television systems, there is a need to minimise the bandwidth to transmit the information in three colour channels while retaining acceptable image quality. For historical reasons this was done by analogue techniques compatible with existing black and white TV. The human eye resolves fine luminosity detail but misses much of the finer colour information. It is therefore common practice to encode a television image as a luminance signal and two chrominance signals with most of the bandwidth devoted to the luminance information. The exact chrominance coordinates used to define the chromaticity will depend upon the transmission system used. The spatial resolution of the chromaticity signal is then lower than that of the luminance signal; the higher spatial frequencies of the chromaticity information must be filtered out to avoid interfering with the luminance information. In practice, this method of bandwidth reduction has proved very successful for a moving colour image, as the eye's colour resolution of a moving image is relatively poor.

The drawbacks of this type of bandwidth reduction have recently become apparent when capturing a stationary image from an apparently acceptable moving image. It has been found that such "grabbed" images are unacceptable to the human eye due to the poor spatial resolution of the chromaticity signals.

Further problems arise from a fault of the encoding in which a high frequency luminance signal can encroach on the chromaticity signal frequency bands giving a spurious chromatic patterning. For this and other reasons the chromaticity signals are usually noisier than the luminance signal.

SUMMARY OF THE INVENTION

In accordance with one aspect of the present invention, a method of enhancing a video image defined by luminance information and chromaticity information, comprises for a number of selected regions of the image (a) determining a statistical relationship between the luminance information and the chromaticity information for the selected region; and, (b) generating modified chromaticity information for at least a portion of the selected region by applying the determined statistical relationship to the luminance information for the said portion.

A typical image may be said to consist of many features where each feature has a fairly uniform colour but may have fine luminosity detail. These features generally have sharp edges. It is the poor reproduction of the jump in colour at these edges that the eye finds unsatisfactory.

The basis of the invention is as follows. These features are very likely to have a jump in luminosity at their edges; pure colour boundaries in real images are very rare. The jumps in luminosity at the edges will be well described by the high resolution luminance data. A process that sharpens the jumps in colour, and locates them on the jumps in luminosity will improve the appearance of such features in the image. The invention takes the "edgeness" from the luminance data and imposes it on the chrominance data.

For example, as an edge between dark red and light green regions is approached, there will be a well defined dark to light jump but a blurred red to green jump. The invention determines how the redness may be considered to vary as a function (typically a linear function) of the brightness in the immediate vicinity of the edge. Using this function a new redness distribution can be calculated from the brightness information. This version of the red-green data will have the high resolution edges of the luminosity data and will have none of the spurious high frequency information of the raw chromatic data.

Typically, the luminance and chromaticity information will define the image in digital form as discrete values. However, the method could be applied to analogue representations.

In this specification, "chromaticity" is a general term referring to the non-luminance information. Typically there will be two chrominance axes or coordinates although one or more than two are feasible in certain applications.

Preferably, step (a) comprises carrying out a regression analysis to generate a relationship between the luminance (L) and a chrominance coordinate (I) of the form:

$$I = C_0 + \Sigma C_n F_n(L) + \ldots$$

where $F_n$ is a general function series, such as a power series, of L.

The intention of this analysis is to determine values for the constants $C_0$ $C_1$ etc. Preferably, a linear relationship is determined between luminance and chromaticity leading to the generation of just two regression coefficients for each chromatic signal.

Conveniently, step (a) comprises a preliminary step of applying a local averaging process over subsidiary regions within the selected region to reduce the luminance information to the same spatial resolution as the chromaticity information. The averaging processes used during step (a) also reduce the noise in the chromaticity signal.

In accordance with a second aspect of the present invention, apparatus for enhancing a video image defined by luminance information and chromaticity information, comprises processing means for determining a statistical relationship between the luminance information and the chromaticity information for a number of selected regions of the image; and modified chromaticity information generating means for generating modified chromaticity information for at least a portion of the selected region by applying the determined statistical relationship to the luminance information for the said portion.

Typically, the apparatus will include a suitably programmed microcomputer, the information being represented digitally.

Although the invention could be applied to a representation of an image having a luminance signal and a single chrominance signal, typically, the invention will be applied to a representation comprising a luminance signal and two chrominance signals, separate relationships being determined in step (a) between the luminance signal and each chrominance signal.

The chrominance coordinates may represent different colour properties of the image depending on the transmission standard (e.g. NTSC or PAL).

Although the loss in chromaticity resolution typically occurs at the encoding stage before recording or transmission, this process may also be used to improve images that have lost chromaticity resolution in other ways. Some detector "arrays" used in cameras, for example, have a simplified design that inherently restricts the resolution of the chromaticity signal.

Though the process has hitherto been described in terms of static image capture, it could be used for dynamic image enhancement.

Preferably, each region has the same size and is typically square or rectangular.

It is useful to weight some areas of the region, such as the centre, so they have more influence than others. It is furthermore useful in some cases to divide the region into smaller subregions where the results are locally averaged; this reduces the computation and makes the resolutions compatable.

Preferably, the method further comprises, prior to step (b) checking the degree of correlation between the individual chromaticity and luminance values with the determined statistical relationship. If there is no or little correlation then the method could be terminated prior to step (b). The degree of correlation could be determined in any conventional manner such as "least squares" fit.

An example of a method and apparatus for enhancing a video image in accordance with the present invention will now be described with reference to the accompanying drawings, in which:

DETAILED DESCRIPTION OF AN EMBODIMENT

A typical video image as transmitted in a conventional television system is defined by three signals: a luminance signal (L), and two chromaticity signals (I, Q). The luminance signal defines the luminance component of the image at the highest resolution and, as has previously been explained, due to the nature of the human eye, it has not been necessary in the past to generate the chromaticity signals at such a high resolution. In one example, the I signal is generated at $\frac{1}{4}$ the resolution and the Q at 1/9 the resolution of the luminance signal resolution 1.

Figure 1:
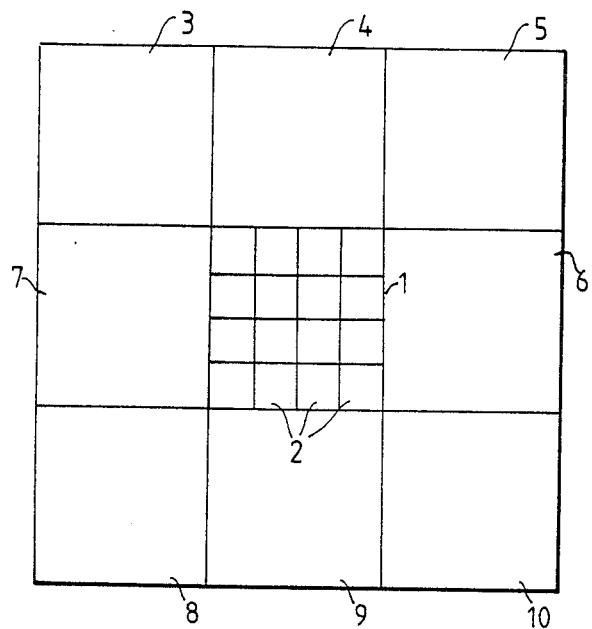
FIG. 1 is an enlarged, schematic representation of part of an image to be enhanced illustrating the different sample regions concerned.

FIG. 1 illustrates by reference numeral 1 a subsidiary region of $4 \times 4$ image pixels 2. Each of these pixels has a value of L, I and Q associated with it.

Figure 3:
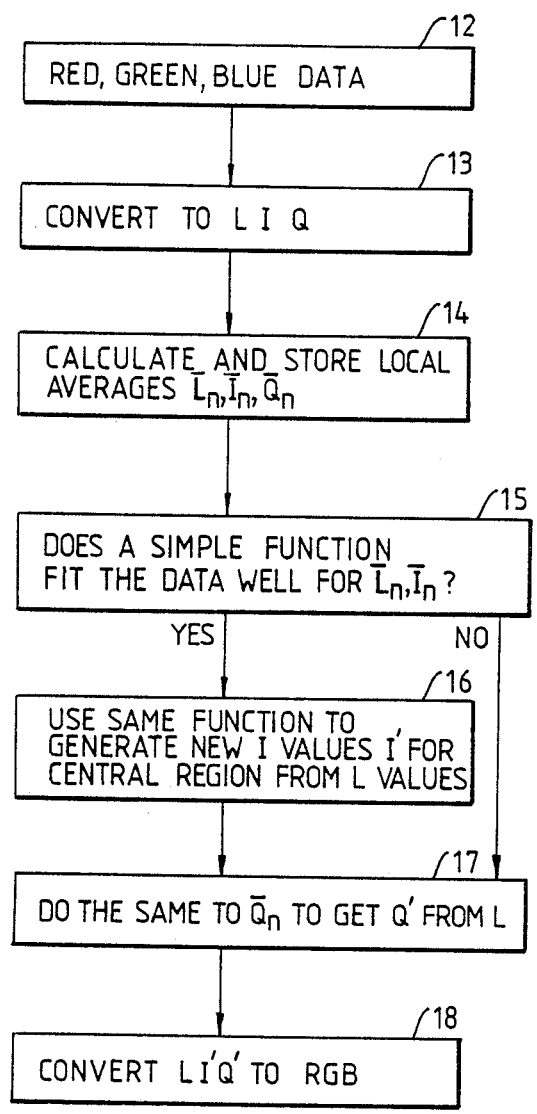
FIG. 3 is a flow diagram illustrating the steps in the method for a single, selected region; and, FIG. 4 is a block diagram of apparatus for carrying out the method.
Figure 4:
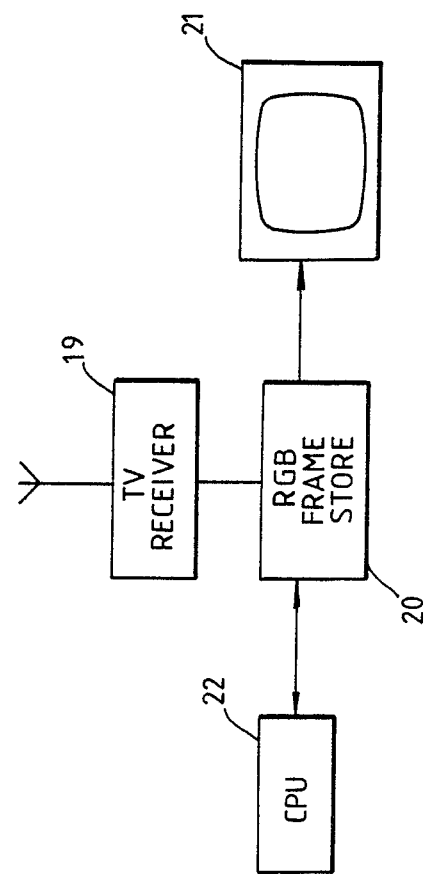

Coveniently the TV signal (FIG. 4) from a device such as a TV receiver 19 is decoded to give red, green and blue signals. One frame of these RGB signals is continuously updated (Step 12, FIG. 3) in a video memory 20. The operator views the stored image on a monitor 21. When he sees an image he wishes to capture, he indicates this in a conventional manner to the CPU 22 which in turn instructs the video memory 20 to start updating the image.

To enhance the image, the microcomputer first converts the RGB data to LIQ signals (Step 13) and divides each array into equal sized regions, each comprising a number of subsidiary regions having a size corresponding to $4 \times 4$ luminance pixels 2. One such region having nine subsidiary regions 1,3-10 is shown in FIG. 1.

The values of L, I, Q are then averaged for each subsidiary region 1,3-11 and the average values $\bar{L}_3, \bar{I}_3, \bar{Q}_3$ etc are stored (step 14).

A regression analysis is then carried out to calculate regression coefficients of the P and Q averages on L for the central subsidiary region 1 based on the average values determined for all the subsidiary regions 3-10.

The regression analysis attempts to define linear relationships between the $\bar{L}$ values and the $\bar{I}$ and $\bar{Q}$ values respectively. This leads to two linear equations of the form:

$$\bar{L} = C_{0I} + C_{1I} \bar{I}$$

$$\bar{L} = C_{0Q} + C_{1Q} \bar{Q}$$

Figure 2:
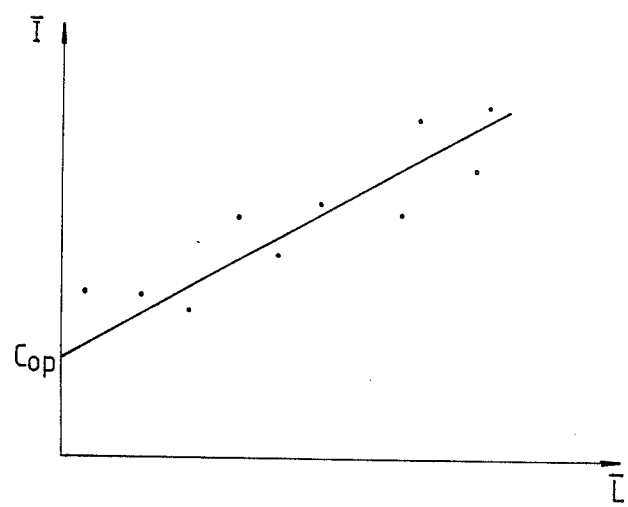
FIG. 2 illustrates graphically an example of the relationship between the mean luminance and a mean chromaticity component.

An example of the first of these equations is illustrated graphically in FIG. 2.

These equations are then taken to apply to the original unaveraged luminosity and chromaticity L,I',Q', where I',Q' represent the chromaticity before the extra resolution was lost.

The regression analysis (step 15) yields values for the two regression coefficients for the region 1 linking L and I. The microcomputer 22 then determines (step 15) whether the linear function derived fits the L, I data well for the region. This may be achieved by obtaining the sum of the squares of the differences between each data point and the function and comparing with a predetermined threshold. If the sum is less than a threshold, the microcomputer then determines (step 16) a chromatic value (I) for each luminance pixel 1 using the regression coefficients just calculated. If the sum exceeds the threshold, the I values are left unchanged and step 17 is immediately processed.

Steps 14, 15 are then repeated for the Q signal (step 17).

The resultant I' and Q' signals for each luminance pixel 2 (which may or may not be different from the original values) are then stored and the method repeated on the other major regions which will typically overlap so that each subsidiary region (e.g. regions 3-10) of major region will itself form a central subsidiary region of another major region.

Finally, the LIQ information stored is transformed back to RGB (step 18) to enable the resultant image to be displayed on the monitor 21.

It will be appreciated that there are many variations to this method and for example higher order regression coefficients could be calculated.

I claim:

1. A method of enhancing a video image defined by luminance information and chromaticity information representing said image as a plurality of regions, the method comprising for each of a number of said selected regions of the image
    (a) determining a statistical relationship between said luminance information and said chromaticity information for the selected region; and, (b) generating modified chromaticity information for at least a portion of said selected region by applying said determined statistical relationship to said luminance information for the said portion.

2. A method according to claim 1, wherein said step (a) comprises carrying out a regression analysis to generate a relationship between said luminance (L) and a chrominance coordinate (I) of the form:

$$I = C_0 + \Sigma C_n F_n(L) + \ldots$$

where $F_n$ is a general function series, such as a power series, of L.

3. A method according to claim 2, wherein a linear relationship is determined between luminance and chromaticity.

4. A method according to claim 1, wherein step (a) comprises a preliminary step of applying a local averaging process over subsidiary regions within said selected region to reduce said luminance information to the same spatial resolution as said chromaticity information.

5. A method according to claim 1 for enhancing an image defined by a luminance signal and two chrominance signals, separate relationships being determined in step (a) between said luminance signal and each said chrominance signal.

6. A method according to claim 1, further comprising, prior to step (b) checking the degree of correlation between the individual chromaticity and luminance values with said determined statistical relationship.

7. Apparatus for enhancing a video image defined by luminance information and chromaticity information representing said image as a plurality of regions, the apparatus comprising processing means (22) for determining a statistical relationship between said luminance information and said chromaticity information for each of a number of said selected regions of said image; and modified chromaticity information generating means for generating modified chromaticity information for at least a portion of said selected region by applying said determined statistical relationship to said luminance information for the said portion.

* * * * *